United States Patent
Ali et al.

(10) Patent No.: US 11,569,892 B2
(45) Date of Patent: Jan. 31, 2023

(54) METHOD AND APPARATUS FOR BEAM MANAGEMENT IN MULTI-MODULE DEVICES

(71) Applicant: Samsung Electronics Co., Ltd., Suwon-si (KR)

(72) Inventors: Anum Ali, Plano, TX (US); Jianhua Mo, Allen, TX (US); Boon Loong Ng, Plano, TX (US); Vutha Va, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/446,122

(22) Filed: Aug. 26, 2021

(65) Prior Publication Data

US 2022/0158711 A1    May 19, 2022

Related U.S. Application Data

(60) Provisional application No. 63/115,837, filed on Nov. 19, 2020.

(51) Int. Cl.
*H04L 5/12* (2006.01)
*H04B 7/06* (2006.01)
*H04B 7/08* (2006.01)

(52) U.S. Cl.
CPC ......... *H04B 7/0695* (2013.01); *H04B 7/0608* (2013.01); *H04B 7/0639* (2013.01); *H04B 7/0802* (2013.01)

(58) Field of Classification Search
CPC .. H04B 7/0695; H04B 7/0608; H04B 7/0639; H04B 7/0802

USPC ........ 375/262, 261, 260, 259, 316, 219, 295
See application file for complete search history.

(56) References Cited

U.S. PATENT DOCUMENTS

| | | | |
|---|---|---|---|
| 10,742,298 B2 | 8/2020 | Nilsson et al. | |
| 10,820,323 B2 | 10/2020 | Ho et al. | |
| 10,833,740 B1* | 11/2020 | Lin | H04B 7/0617 |
| 2006/0164320 A1* | 7/2006 | Lastinger | H01Q 15/16 343/893 |
| 2019/0173547 A1 | 6/2019 | Li et al. | |

(Continued)

FOREIGN PATENT DOCUMENTS

| | | |
|---|---|---|
| CN | 110880958 A | 3/2020 |
| KR | 10-2018-0013099 A | 2/2018 |

(Continued)

OTHER PUBLICATIONS

International Search Report and Written Opinion dated Feb. 17, 2022 regarding International Application No. PCT/KR2021/016425, 11 pages.

*Primary Examiner* — Zewdu A Kassa

(57) ABSTRACT

An electronic device and methods for performing low-latency, low-power beam management are disclosed herein. An electronic device for performing low-latency, low-power beam management comprises a plurality of antenna modules and a processor. The processor is configured to determine a number of active antenna modules to include in a set of active antenna modules, and select the set of active antenna modules, from among the plurality of antenna modules, based on a spherical coverage of the set of active antenna modules and based on information on blockage states of the plurality of antenna modules.

20 Claims, 11 Drawing Sheets

(56) References Cited

U.S. PATENT DOCUMENTS

| | | |
|---|---|---|
| 2019/0261345 A1 | 8/2019 | Shi et al. |
| 2019/0379427 A1 | 12/2019 | Geekie et al. |
| 2020/0028544 A1 | 1/2020 | Bengtsson et al. |
| 2020/0144713 A1 | 5/2020 | Jung et al. |
| 2020/0169306 A1 | 5/2020 | Kim et al. |
| 2020/0195320 A1* | 6/2020 | Raghavan ............ H04B 7/0617 |
| 2020/0195336 A1 | 6/2020 | Raghavan et al. |
| 2020/0205087 A1* | 6/2020 | Hong .................. H04W 52/283 |
| 2020/0220572 A1 | 7/2020 | Kwon et al. |
| 2020/0313715 A1 | 10/2020 | Lee et al. |
| 2021/0289583 A1* | 9/2021 | Zhang .................. H04W 76/28 |

FOREIGN PATENT DOCUMENTS

| | | |
|---|---|---|
| KR | 10-2167832 B1 | 10/2020 |
| WO | 2020162644 A1 | 8/2020 |

\* cited by examiner

METHOD AND APPARATUS FOR BEAM MANAGEMENT IN MULTI-MODULE DEVICES

CROSS-REFERENCE TO RELATED APPLICATION(S) AND CLAIM OF PRIORITY

This application claims priority under 35 U.S.C. § 119(e) to U.S. Provisional Patent Application No. 63/115,837 filed on Nov. 19, 2020, which is hereby incorporated by reference in its entirety.

TECHNICAL FIELD

This disclosure relates generally to beam management in wireless communications systems. Embodiments of this disclosure relate to methods and apparatuses for selecting active antenna modules and efficiently performing beam management in a multi-module wireless communications system.

BACKGROUND

Wireless communication has been one of the most successful innovations in modern history. Recently, the number of subscribers to wireless communication services exceeded five billion and continues to grow quickly. The demand for wireless data traffic is rapidly increasing due to the growing popularity among consumers and businesses of smart phones and other mobile data devices such as tablets, "note pad" computers, net books, eBook readers, and machine type of devices. In order to meet the high growth in mobile data traffic demand and support new applications and deployments, improvements in radio interface efficiency and coverage is of paramount importance.

SUMMARY

Embodiments of the present disclosure provide a method and an apparatus for low-latency, low-power beam management.

In one embodiment, an electronic device is provided, comprising a plurality of antenna modules and a processor. The processor is configured to determine a number of active antenna modules to include in a set of active antenna modules, and select the set of active antenna modules, from among the plurality of antenna modules, based on a spherical coverage of the set of active antenna modules and based on information on blockage states of the plurality of antenna modules.

In another embodiment, another electronic device is provided, comprising a set of active antenna modules and a processor. The processor is configured to perform an iterative beam search on at least one active antenna module of the set of active antenna modules to determine an overall best beam of the at least one active antenna module. The processor is configured to perform each iteration of the beam search within a coverage area of a previous best beam determined by an immediately previous iteration of the beam search, and to determine an updated best beam from among beams narrower than the previous best beam, until the overall best beam of the at least one active antenna module is determined from among the narrowest beams that the at least one active antenna module is able to form.

In another embodiment, a method of beam management is provided, including the steps of determining a number of active antenna modules to include in a set of active antenna modules and selecting the set of active antenna modules, from among a plurality of antenna modules of an electronic device, based on a spherical coverage of the set of active antenna modules and based on information on blockage states of the plurality of antenna modules.

In another embodiment, a non-transitory computer-readable medium is provided. The non-transitory computer-readable medium is configured to store instructions that, when executed by a processor, cause the processor to determine a number of active antenna modules to include in a set of active antenna modules, and to select the set of active antenna modules, from among the plurality of antenna modules, based on a spherical coverage of the set of active antenna modules and based on information on blockage states of the plurality of antenna modules.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present disclosure and its advantages, reference is now made to the following description taken in conjunction with the accompanying drawings, in which like reference numerals represent like parts.

DETAILED DESCRIPTION

Figure 1:
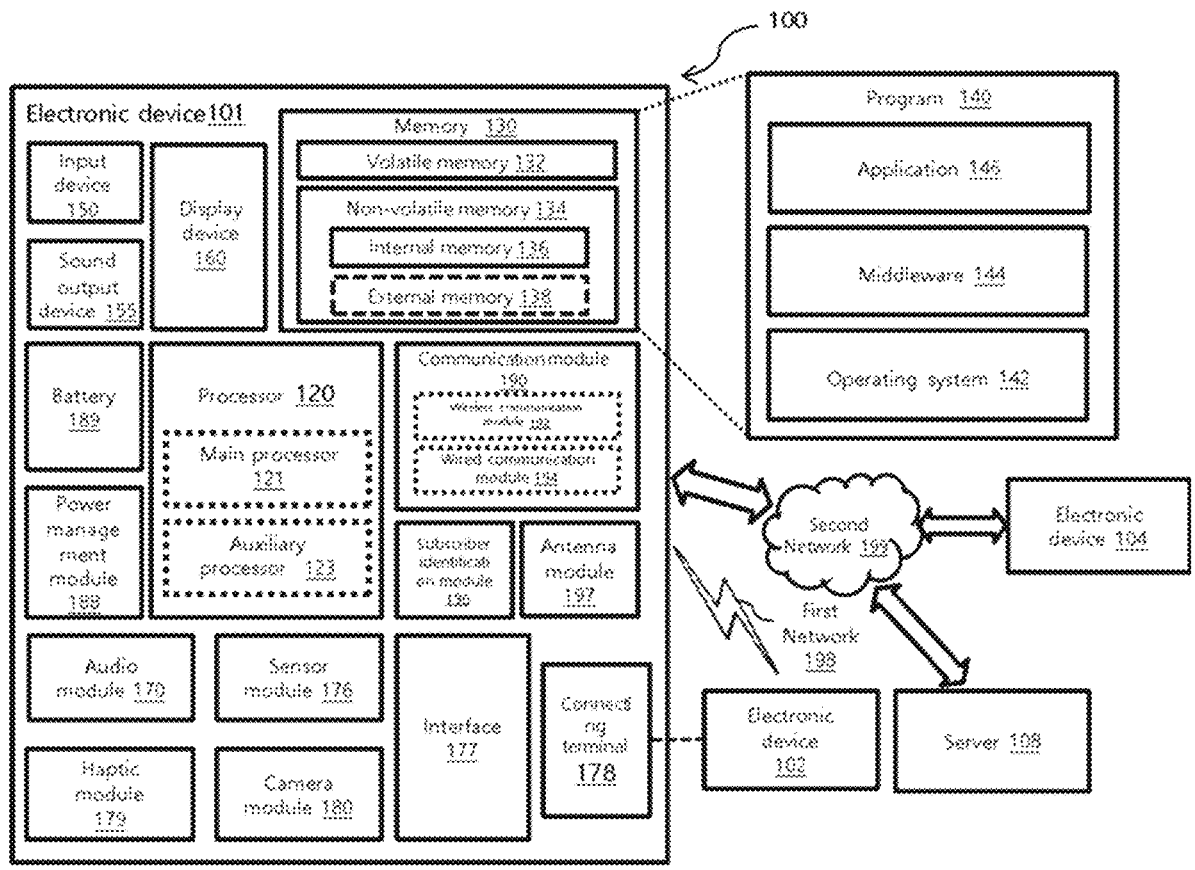
FIG. 1 illustrates an example electronic device in a network environment according to various embodiments of the present disclosure.

FIGS. 1 through 10B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented to include higher frequency (mmWave) bands, such as 28 GHz or 60 GHz bands or, in general, above 6 GHz bands, so as to accomplish higher data rates or, in lower frequency bands, such as below 6 GHz, to enable robust coverage and mobility support. A 5G terminal or user equipment (UE) can be equipped with multiple antenna elements. There can also be one or more antenna modules fitted on the terminal, where each module can include one or more antenna elements. Beamforming is an important factor when a UE tries to establish a connection with a base station (B S). To compensate for the narrower analog beamwidth in mmWave, analog beam sweeping can be employed to enable wider signal reception or transmission coverage for the UE.

The present disclosure relates generally to 5G wireless communication systems. Aspects of the present disclosure may also be applied to deployment of 5G communication system, 6G or even later release which may use terahertz (THz) bands. A communication system includes a downlink (DL) that conveys signals from transmission points such as base stations (BSs), eNodeBs (eNBs), or gNodeBs (gNBs) to user equipments (UEs) and an uplink (UL) that conveys signals from UEs to reception points such as eNodeBs. A UE, also commonly referred to as a terminal or a mobile station, may be fixed or mobile and may be a cellular phone, a personal computer device, etc. An eNodeB, which is generally a fixed station, may also be referred to as an access point or other equivalent terminology. To decrease propagation loss of the radio waves and increase the transmission distance, beamforming, massive multiple-input multiple-output (MIMO), full dimensional MIMO (FD-MIMO), array antenna, and analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

Depending on the network type, the term "base station" or "BS" can refer to any component (or collection of components) configured to provide wireless access to a network, such as transmit point (TP), transmit-receive point (TRP), an enhanced base station (eNB or gNB), a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this disclosure to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this disclosure to refer to remote wireless equipment that wirelessly accesses a B S, whether the UE is a mobile device (such as a mobile telephone or smartphone) or is normally considered a stationary device (such as a desktop computer or vending machine).

Embodiments of the present disclosure recognize that beamforming is an important factor when a UE tries to establish a connection with a BS in mmWave systems. To compensate for the narrower analog beamwidth in mmWave, analog beam sweeping can be employed to enable wider signal reception or transmission coverage for the UE. A beam codebook comprises a set of codewords, where a codeword is a set of analog phase shift values, or a set of amplitude plus phase shift values, applied to the antenna elements within an antenna module (or panel), in order to form an analog beam.

Embodiments of the present disclosure further recognize that beam management (BM) in a multi-module device (i.e., a device including multiple antenna modules) provides some unique challenges because the number of beams that need to be searched before the best beam can be found will generally scale proportionally to the number of active antenna modules. This implies higher latency in beam search and poor performance of the communication system. Furthermore, there are several challenges if multiple antenna modules are to be activated simultaneously. As an example, first it needs to be determined how many antenna modules need to be activated, and second it needs to be determined which antenna modules need to be activated. Finally, beam management typically relies on a table of some metric signal quality corresponding to each beam in the active antenna modules.

The present disclosure considers reference signal received power (RSRP) to be the signal quality metric, but other metrics, such as signal-to-interference-and-noise ratio (SINR) or signal-to-noise ratio (SNR), or reference signal received quality (RSRQ) are also possible. If the active antenna modules suddenly change, then the RSRP table needs to be filled for the beams of the currently active antenna module. The period during which the RSRP table is filled can cause disruption in the system, and a proper mechanism is required to select the beam to be used for transmission/reception before one cycle of beam-search is completed. Finally, low-latency and low-power BM strategies are necessary for successful multi-module operation.

Accordingly, embodiments of the present disclosure provide low-latency and low-power BM strategies that include determining a set of active antenna modules by pruning the set of possible candidate antenna modules based on a physical folding state of a foldable electronic device and based on information from a blocking sensor in order to obtain a number of active modules that maximizes spherical coverage. The low-latency and low-power BM strategies also include inferring, by the electronic device, the best initial beam in response to a change of the set of active modules.

FIG. 1 illustrates an example electronic device 101 in a network environment 100 according to various embodiments of the present disclosure. In this embodiment, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108.

The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one of the components (e.g., the display device 160 or the camera module 180) may be omitted from the electronic device 101, or one or more other components may be added in the electronic device 101. In some embodiments, some of the components may be implemented as a single integrated circuit. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101 instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data from the outside (e.g., from a user) of the electronic device 101, to be used by another component (e.g., the processor 120) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a recording, and the receiver may be used for incoming calls. According to an embodiment, the receiver may be implemented separate from or as part of the speaker.

The display device 160 may visually provide information to the outside (e.g., to a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force induced by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, a luminance sensor, a blockage sensor, or a folding state sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication.

According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, WI-FI DIRECT, Ultra-WideBand (UWB), or INFRARED DATA ASSOCIATION (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside of the electronic device 101 (e.g., to or from an external electronic device). According to an embodiment, the antenna module 197 may include an antenna including a radiating element composed of a conductive material or a conductive pattern formed in or on a substrate (e.g., a PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. According to an embodiment, the electronic device 101 may include multiple antenna modules 197. Each antenna module 197 can have multiple antennas, referred to as antenna elements, configured such that the antenna module 197 is capable of beamforming using the multiple antenna elements.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type from, the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 according to various embodiments may be one of various types of electronic devices. The electronic devices may include, for example, a portable communication device (e.g., a smartphone), a computer device, a portable multimedia device, a portable medical device, a camera, a wearable device, or a home appliance. In various embodiments, the electronic device 101 may be a 5G UE or a 5G BS. It is understood that the electronic devices are not limited to those described above.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., GOOGLE PLAY STORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
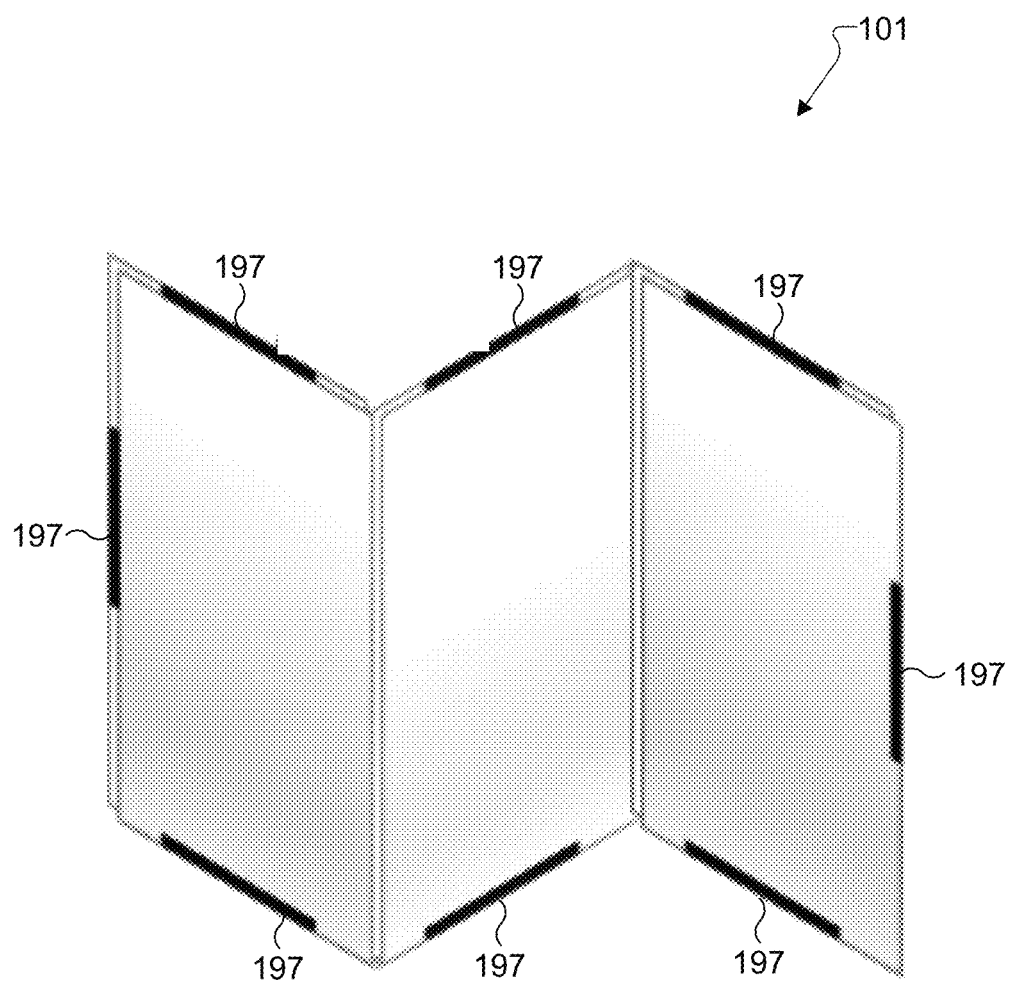
FIG. 2 illustrates an example electronic device according to embodiments of the present disclosure.

FIG. 2 illustrates an example electronic device 101 according to embodiments of the present disclosure. For the purposes of this disclosure, the electronic device 101 will be discussed as a UE, but it is understood that it could be any suitable wireless communication device. The electronic device 101 is a multi-module device, including multiple antenna modules 197. In this example, the electronic device 101 includes 8 antenna modules 197, but it is understood that more or less antenna modules 197 could be included. The electronic device 101 is a foldable device, and information on a folding state of the device (e.g., unfolded, folded, partially folded) may be obtained from, e.g., a folding state sensor of sensor module 176.

The inclusion of multiple antenna modules 197 allows for robustness against blockage and better spherical coverage as compared to the use of a single antenna module 197. Blockage can refer to blockage of an antenna module's radiation or reception of radiation by, for example, a part of a user's body (e.g., a hand), by another object in the external environment, or by another part of the electronic device 101 itself (e.g., due to the device being in a folded or partially folded state). FIG. 2 shows one example of antenna module 197 placement on a foldable device.

Embodiments discussed herein below relate to methods for operation of a multi-module UE, when multiple antenna modules 197 are activated simultaneously. The methods include strategies to decide the number of active antenna modules 197, strategies to decide the set of active antenna modules 197, strategies to determine the best beam for transmission/reception after the set of active antenna modules 197 changes and before one beam-search cycle is completed, and low-latency and low-power BM strategies, ensuring reliable links with higher throughput.

Figure 3:
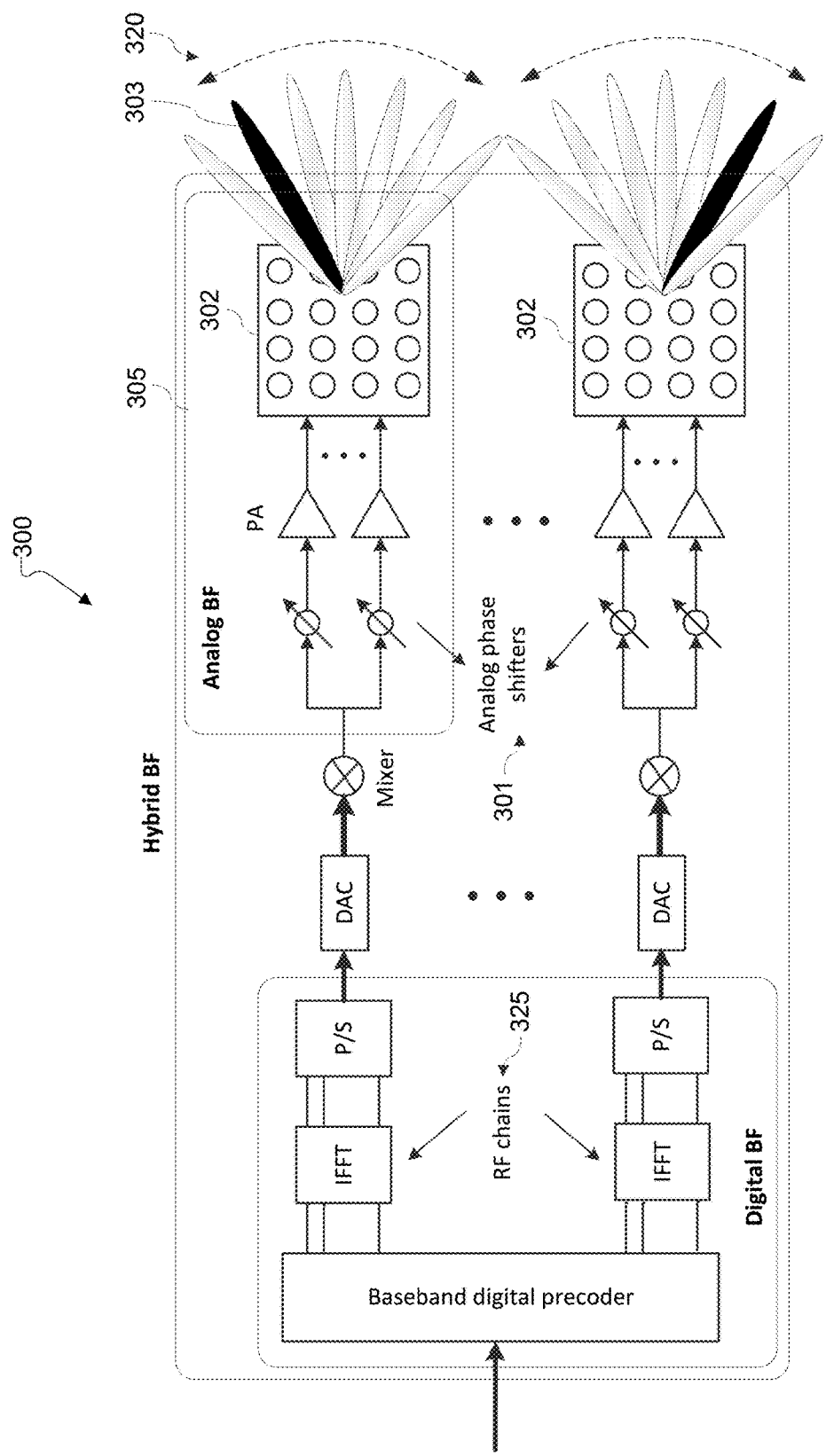
FIG. 3 illustrates a block diagram of example hybrid beamforming (BF) hardware 300 according to embodiments of the present disclosure.

FIG. 3 illustrates a block diagram of example hybrid beamforming (BF) hardware 300 according to embodiments of the present disclosure. The hybrid BF hardware 300 is implemented in the electronic device 101 of FIG. 1. For the purposes of this disclosure, embodiments will be discussed wherein the electronic device 101 is UE and wherein the electronic device 101 is a BS. However, it is understood that any other beamforming-capable wireless communication device could include hybrid BF hardware 300.

For mmWave band devices, although the number of antenna elements can be large for a given form factor, the number of digitally precoded ports—which can correspond to the number of digital RF chains 325—tends to be limited due to hardware constraints (such as the feasibility of installing a large number of ADCs or DACs at mmWave frequencies) as illustrated in FIG. 3.

In this case, one digital RF chain 325 is mapped onto a large number of antenna elements which can be controlled by a bank of analog phase shifters 301. One digital RF chain 325 can then correspond to one antenna sub-array 302 (which could correspond to an antenna module 197) which produces a narrow analog beam 303 through analog beamforming 305. This analog beam 303 can be configured to sweep across a wide range of angles 320 by varying the phase shifter bank 301 across a transmission time interval.

A BS could utilize one or multiple transmit beams to cover the whole area of one cell. The BS may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may make it feasible for BS to provide coverage with a single transmit beam, i.e., to ensure adequate received signal quality at all UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at all UE locations within the coverage area.

However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the BS may form a number of transmit beams, each providing coverage over a region narrower than the overall coverage region, but providing the transmit power amplification sufficient to overcome the higher signal propagation loss due to the usage of higher transmit signal carrier frequencies. The UE may also form receive beams to increase the signal-to-interference-and-noise ratio (SINR) at the receiver. Likewise, in the uplink, the UE may form transmit beams and the BS may form receive beams.

To assist the UE in determining its receive and/or TX beam, a beam sweeping procedure is employed consisting of the BS transmitting a set of transmit beams to sweep the cell area and the UE measuring the signal quality on different beams using its receive beams. To facilitate candidate beam identification, beam measurement and beam quality reporting, the BS configures the UE with one or more reference signal (RS) resources (e.g., SS Block, Periodic/Aperiodic/Semi-Persistent CSI-RS resources or CRIs) corresponding to a set of TX beams. An RS resource refers to a reference signal transmission on a combination of one or more time (OFDM symbol)/frequency (resource element)/spatial (antenna port) domain locations. For each RX beam, the UE reports different TX beams received using that RX beam, ranked in order of signal strength (RSRP) and optionally CSI (CQI/PMI/RI)). Based on the UE's measurement report feedback, the BS configures the UE with one or more Transmission Configuration Indicator (TCI) states for reception of PDCCH and/or PDSCH.

Although FIG. 3 illustrates one example of hybrid BF hardware 300, various changes may be made to FIG. 3. For example, various components in FIG. 3 could be combined, further subdivided, or omitted and additional components could be added according to particular needs.

Figure 4:
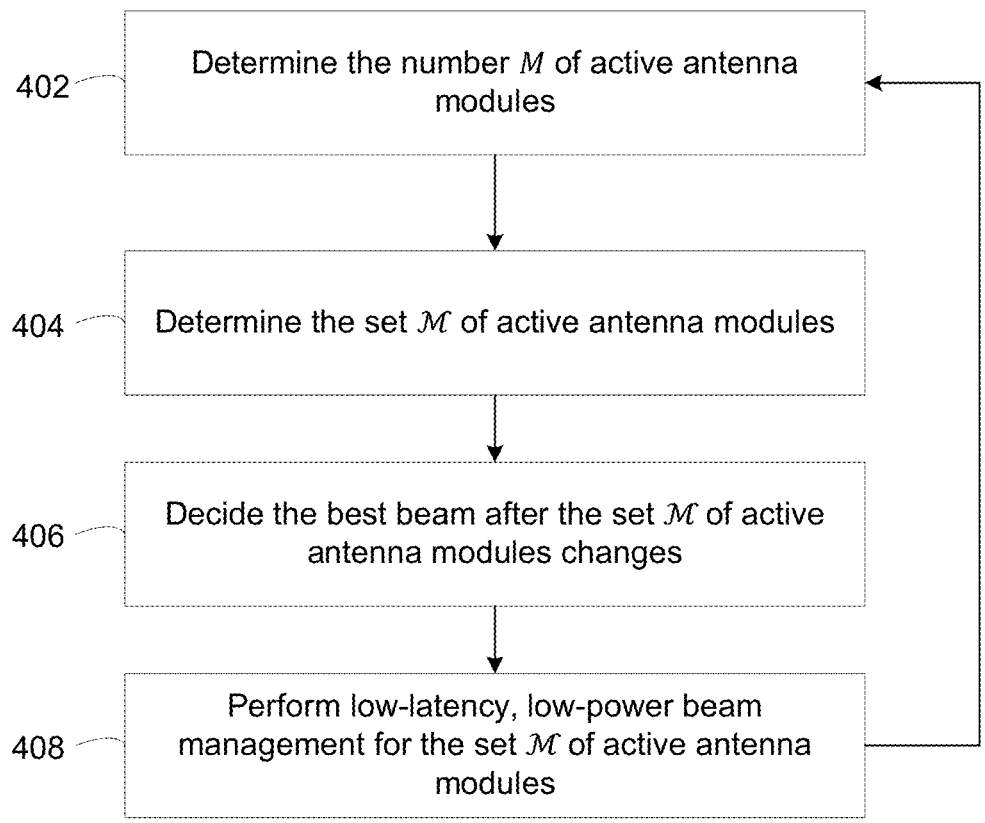
FIG. 4 illustrates an overall process for beam management in a multi-module electronic device according to embodiments of the present disclosure.

FIG. 4 illustrates an overall process for beam management in a multi-module electronic device 101 according to embodiments of the present disclosure. For the purposes of this disclosure the electronic device 101 will be discussed as a UE, but it is understood that it could be any suitable wireless communication device.

First, the number M of simultaneously active antenna modules 197 is determined at step 402. Then the set $\mathcal{M}$ of active antenna modules 197 is determined at step 404, such that the set $\mathcal{M}$ contains the indices of the active antenna modules 197 from among the set $\{1, \ldots, K\}$ of all antenna modules 197, where K is the total number of antenna modules 197 contained in the UE.

A particular aspect of beam management for a multi-module UE is that as the set $\mathcal{M}$ of active antenna modules 197 changes, the RSRP table, i.e., the table containing the measured RSRP values for BM, changes to correspond to the beams formed by the currently active antenna modules 197. However, it takes one beam search cycle before the new RSRP table can be filled. The RSRP table therefore cannot be used to determine the best beam before the first beam search cycle after the set $\mathcal{M}$ of active antenna modules 197 changes (or is updated), and accordingly a best beam to be used for transmission/reception before the first beam search cycle after the set $\mathcal{M}$ of active antenna modules 197 changes is determined at step 406.

Subsequently, at step 408, low-latency low-power BM for the set $\mathcal{M}$ of active modules is performed. The aforementioned steps may be inter-dependent. For example, the RSRP information obtained during the BM procedure of step 408 may be used to determine the set $\mathcal{M}$ of active antenna modules 197, and the set $\mathcal{M}$ of active antenna modules 197 in turn affects the RSRP information that is available. Therefore, although the order of the steps is conceptually listed above, the earlier steps in the process may rely on information obtained during the later steps, and the process can adapt over time based on information obtained at the various steps.

Figure 5:
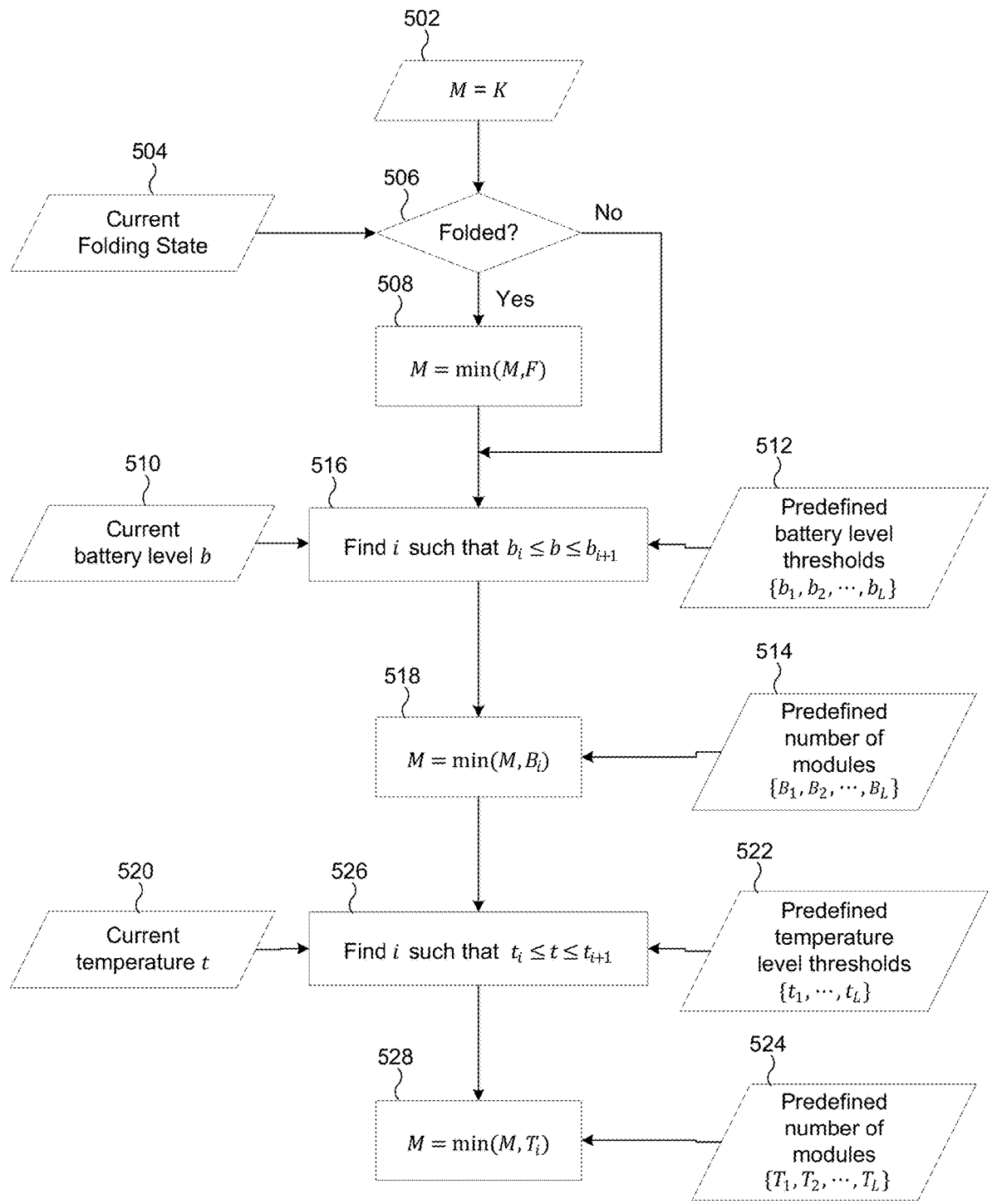
FIG. 5 illustrates a process for determining a number of simultaneously active antenna modules according to embodiments of the present disclosure.

FIG. 5 illustrates a process for determining a number M of simultaneously active antenna modules 197 according to embodiments of the present disclosure. For the purposes of this disclosure, the process of FIG. 5 represents operations of an electronic device 101, which is discussed as a UE. It is understood that the operations could apply to any suitable wireless communication devices in any suitable wireless communication system.

In embodiments of FIG. 5, side information coming from onboard sensors of the electronic device 101 helps in determining the number M of active modules 197 out of a total number K of antenna modules 197 included in the electronic device 101. These onboard sensors include, but are not limited to, sensors to determine the current battery level b, the current temperature t, the current folding state (for foldable devices), the current orientation ($\alpha,\beta,\gamma$), etc. In order to generalize the procedure to determine the number M of active modules 197 for both foldable and non-foldable devices, the folding state of non-foldable devices can be considered to always be unfolded. The embodiment of FIG. 5, takes into consideration the folding state, the battery level, and the current temperature of the electronic device 101. In other embodiments, only a subset of these pieces of information may be used, e.g., only the folding state, only the temperature, only the battery level, or any combination of the three.

Initially, the number of active modules 197 is set to M=K (step 502). Subsequently, it is determined whether the device is folded based on folding state information 504 of the device (step 506). If the device is folded, then it is likely that a large number of antenna modules 197 is not required. For example, in the folded state multiple antenna modules 197 may face the same direction, and as a result their beams may cover a similar spatial region. Such antenna modules 197 are redundant, as one antenna module 197 covering a particular spatial region is enough. Furthermore, it may be assumed that when the device is in the folded state a user of the device is more likely to use services that require a low data rate (e.g., audio calling, text messaging, etc.). It may not be necessary to have a large number of antenna modules 197 active to meet the data rate requirement for these applications. A predefined integer F can correspond to a number of active antenna modules 197 needed in the folded state. Accordingly, if the device is folded, a number F of antenna modules 197 are kept active, i.e., M is updated to min(M,F) (step 508).

Next, M is updated based on the current battery level b (information 510) of the device. In some embodiments, a more aggressive M is selected if the current battery level is high, and a more conservative M is selected if the battery level is low. The rationale of such embodiments is to adapt the power usage of the antenna modules 197 to prolong the battery life. It is understood, however, that other methods are possible, e.g., M can be decided based on the battery consumption in the last minute or so.

As the current battery level b drops, it becomes important to take the battery level into account for the selection of M, hence the conservative choice for lower values of M. This is done by comparing the current battery level b to L predefined (or predetermined) battery level thresholds $\{b_1, b_2, \ldots, b_L\}$ (information 512). Associated with each battery level threshold $b_i$ is a predefined integer $B_i$ (information 514), which is a predetermined maximum number of active antenna modules 197 suitable for use at the battery level threshold $b_i$. Accordingly, the current battery level b is compared with the predefined battery level thresholds $\{b_1, b_2, \ldots, b_L\}$ to find i such that $b_i \leq b \leq b_{i+1}$ (step 516), and M is updated to min (M, $B_i$) (step 518).

Finally, M is updated based on the current temperature t (information 520) of the device. Activating multiple antenna modules 197 is likely to result in increased power consumption and hence higher temperature levels in the device. This is more serious for the uplink than for the downlink, as the device is likely to consume higher power in the transmission mode. Therefore, it is important to take into account the temperature level of the device as compared to the maximum permissible/acceptable temperature for the selection of M. Temperature is taken into account by comparing the current temperature t to L predefined temperature level thresholds $\{t_1, \ldots, t_L\}$ (information 522), and corresponding predefined integers $\{T_1, T_2, \ldots, T_L\}$ (information 524), which represent a predetermined maximum number of active antenna modules 197 suitable for use at each temperature level threshold $t_i$. Accordingly, the current temperature t is compared with the temperature level thresholds $\{t_1, \ldots, t_L\}$ to find i such that $t_i \leq t \leq t_{i+1}$ (step 526), and M is updated to min (M,$T_i$) (step 528).

Figure 6:
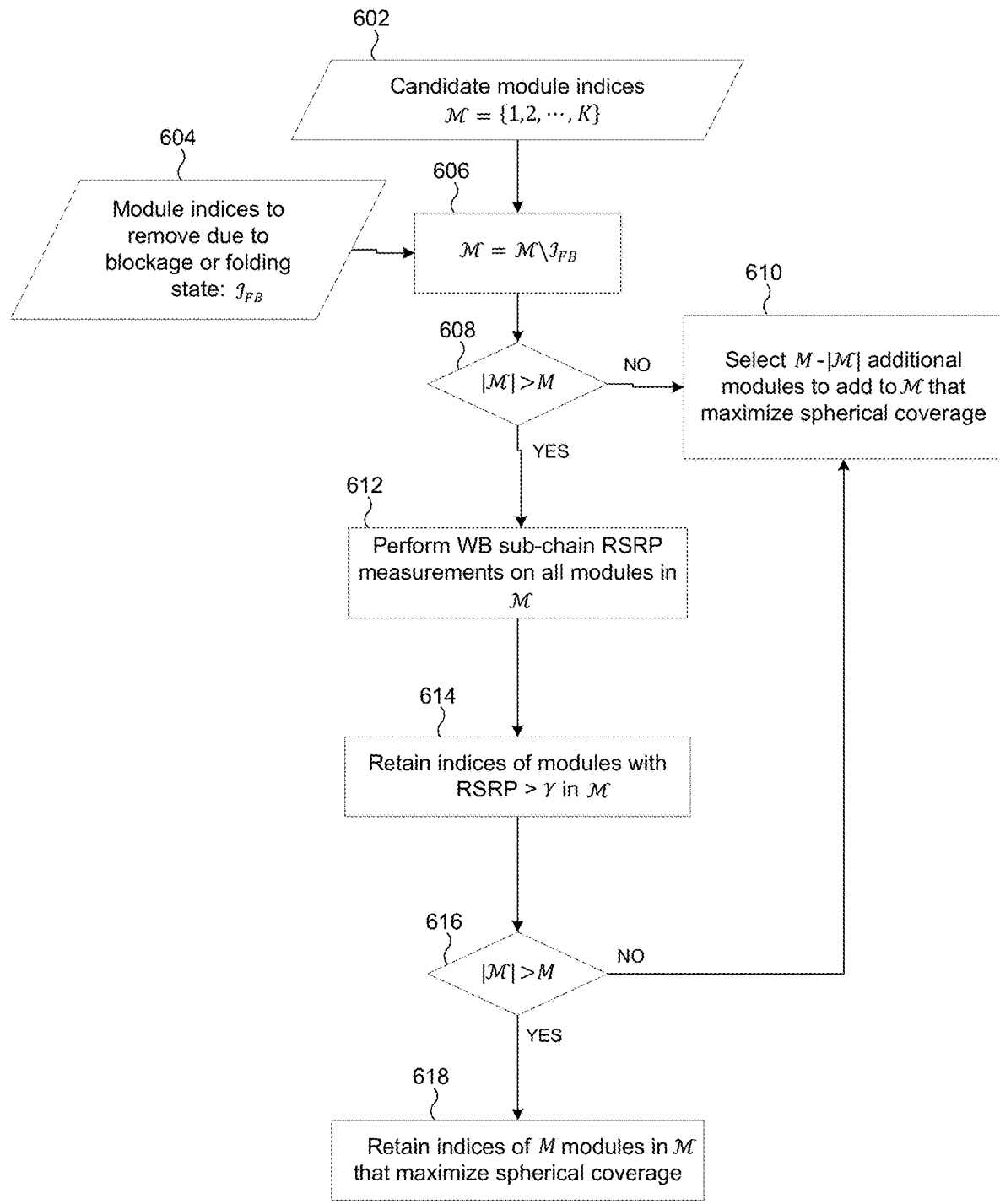
FIG. 6 illustrates a process for determining a set of active antenna modules according to embodiments of the present disclosure.

FIG. 6 illustrates a process for determining a set $\mathcal{M}$ of active antenna modules 197 according to embodiments of the present disclosure. For the purposes of this disclosure, the process of FIG. 6 represents operations of an electronic device 101, which is discussed as a UE. It is understood that the operations could apply to any suitable wireless communication devices in any suitable wireless communication system.

The objective of antenna module selection in embodiments of FIG. 6 is to ensure that active antenna modules 197 are selected such that spherical coverage of the combined selected antenna modules 197 is maximized while minimizing redundancy due to multiple selected antenna modules 197 covering the same angular region within the spherical coverage. Additionally, if there is prior information about an antenna module 197 being blocked (e.g., due to hand blockage) then it is likely that the blocked antenna module 197 will not have high signal strength, and thus should not be selected. Finally, it is preferable to select antenna modules 197 that are likely to result in high RSRP, or other high metrics of signal quality.

Initially, all K antenna modules 197 are considered to be possible candidates for the set $\mathcal{M}$ of active antenna modules 197. Accordingly, the initial assumption is that the set $\mathcal{M} = \{1, 2, \ldots, K\}$, representing the list of indices of all K antenna modules 197 (step 602).

Subsequently, the set is pruned based on the folding state of the device and information from blockage sensors. If there are particular antenna modules 197 that are unlikely to have high gain due to the folding state of the device, or that are redundant because another antenna module 197 covers the same angular region due to the folding state of the device, then these modules can be removed from the set $\mathcal{M}$. A set of indices of such antenna modules 197 is defined as $\mathcal{J}_F$. Input from the blockage sensors is also incorporated. Specifically, $\mathcal{J}_B$ is defined as the set of indices of antenna modules 197 blocked by hand blockage (or any other suitable blockage). Then a union set can be defined as $\mathcal{J}_{FB} = \mathcal{J}_B \cup \mathcal{J}_F$ (information 604), and these antenna modules 197 are removed as candidates from $\mathcal{M}$ such that $\mathcal{M} = \mathcal{M} \setminus \mathcal{J}_{FB}$ (step 606).

After this pruning process of step 606, the size of the set $\mathcal{M}$ (or the cardinality of $\mathcal{M}$, $|\mathcal{M}|$) is compared to the total number of antenna modules 197 that are determined to be simultaneously active (step 608). If $|\mathcal{M}|>M$, then $\mathcal{M}$ can be pruned further, as described below at step 612. Alternatively, if the cardinality $|\mathcal{M}|<M$, then in one embodiment the device may simply operate with the antenna modules 197 in $\mathcal{M}$. In this way the operation will be based on less than M antenna modules 197.

If it is desirable to operate with exactly M antenna modules 197, then $M-|\mathcal{M}|$ other antenna modules 197 are needed to increase the cardinality of $\mathcal{M}$ to M (step 610). The additional $M-|\mathcal{M}|$ antenna modules 197 may be selected to maximize the spherical coverage of the set. It may be desirable to operate with exactly M antenna modules 197 due to some operation consideration. For example, with multiple antenna modules 197 spatial multiplexing is possible, and the device may use the space-time code optimized for M antenna modules 197. Furthermore, the pruning at step 606 based on hand blockage is based on the premise that antenna modules 197 that are blocked are likely to have lower signal strength. That said, those antenna modules 197 may still contribute to the overall transmission, even though this contribution may be less compared to non-blocked antenna modules 197. Accordingly, they could be added back to the set $\mathcal{M}$ at step 610.

Returning to step 608, if $|\mathcal{M}|>M$, then $\mathcal{M}$ needs to be pruned further. One pruning methodology is based on RSRP measurements. In one embodiment, wide beam (WB) sub-chain RSRP measurements can be performed for all modules (step 612). A WB sub-chain refers to a WB that uses only a subset of the antenna elements of an antenna module 197. The rationale of making sub-chain measurements is to reduce the power consumption of this antenna module selection phase. Using the RSRP obtained from the WB sub-chain measurements, the set of indices of antenna modules 197 in $\mathcal{M}$ that have RSRP greater than a threshold, γ, are retained in $\mathcal{M}$, and the indices of antenna modules 197 that have RSRP less than γ are pruned (step 614).

After the pruning process of step 614, the cardinality of $\mathcal{M}$ is checked again (step 616). If $|\mathcal{M}|<M$, then proceed with the options of step 610 to increase the cardinality to M. If $|\mathcal{M}|>M$, then the M antenna modules 197 within $\mathcal{M}$ that maximize the spherical coverage are retained in $\mathcal{M}$ (Step 618). In some embodiments, at step 614, exactly M antenna modules 197 that have the highest RSRP among the antenna modules 197 with RSRP greater than γ are selected to remain in $\mathcal{M}$, and steps 616 and 618 are unnecessary.

In another embodiment, only the sensor information (i.e., the hand blockage sensor information and the folding state information) is used to determine the set $\mathcal{M}$. This embodiment eliminates the RSRP measurements step 612 and the threshold comparison step 614. Instead, if $|\mathcal{M}|>M$ after eliminating the antenna modules 197 in the set $\mathcal{J}_{FB}$ at step 606, then the M antenna modules 197 that maximize the spherical coverage are selected to remain in $\mathcal{M}$. If $|\mathcal{M}|<M$, we choose all the modules in $\mathcal{M}$, and $M-|\mathcal{M}|$ other modules that maximize the spherical coverage. The advantage of this embodiment is that it eliminates the delay associated with RSRP measurements in selecting the set of modules $\mathcal{M}$. This is particularly true if sensor information rate is high and sensor information is readily available.

Figure 7:
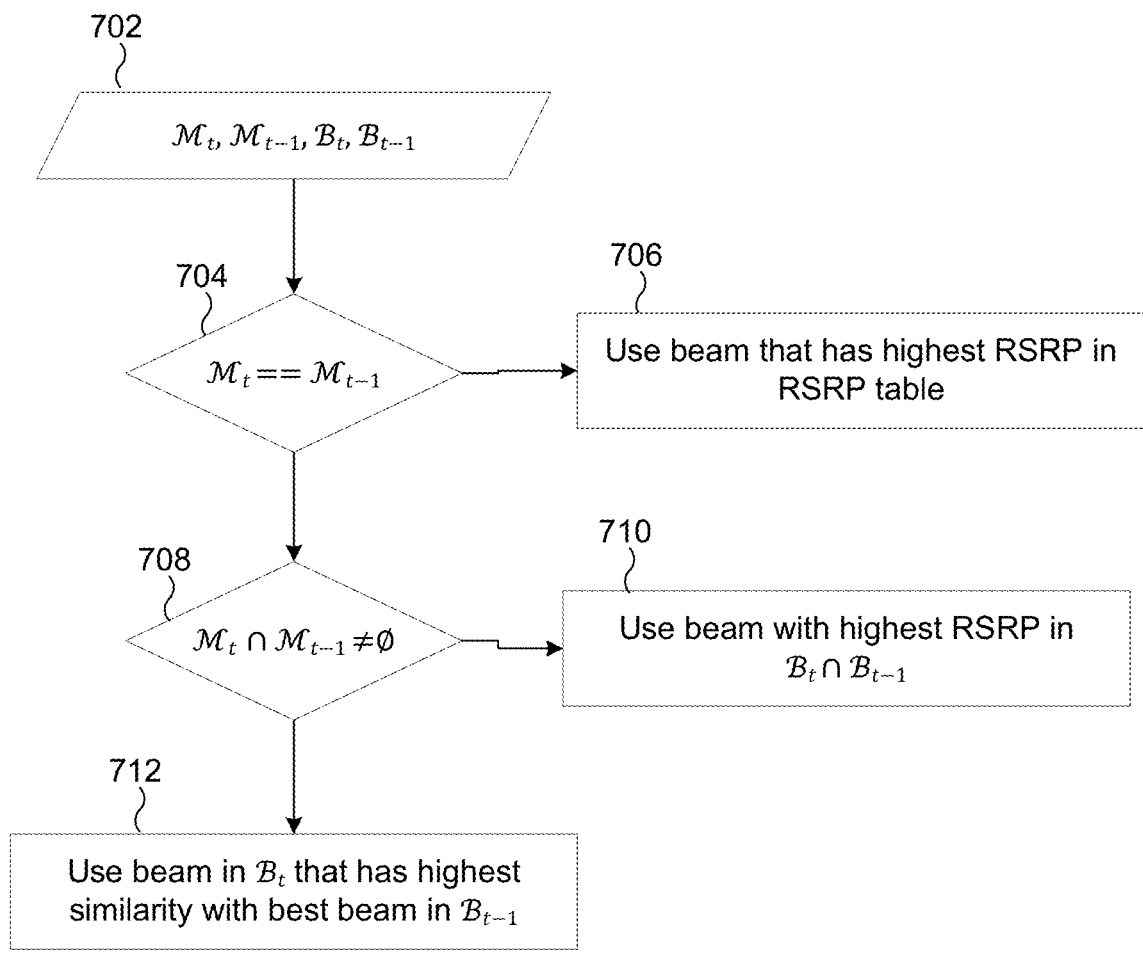
FIG. 7 illustrates a process for determining a best beam to use for transmission/reception after the set of active antenna modules has changed but before the first beam search cycle has been completed according to embodiments of the present disclosure.

FIG. 7 illustrates a process for determining a best beam to use for transmission/reception after the set $\mathcal{M}$ of active antenna modules 197 has changed but before the first beam search cycle has been completed according to embodiments of the present disclosure. The process of FIG. 7 can also be applied when the folding state of a foldable device changes. This is because as the folding state changes the antenna modules 197 face completely different directions, and it is necessary to find the best beam in the current folding state before a cycle of beam search is completed. For the purposes of this disclosure, the process of FIG. 7 represents operations of an electronic device 101, which is discussed as a UE. It is understood that the operations could apply to any suitable wireless communication devices in any suitable wireless communication system.

In order to explain the process of determining the best beam after the module set $\mathcal{M}$ changes, the current module set $\mathcal{M}_t$, previous module set $\mathcal{M}_{t-1}$, current beam set $\mathcal{B}_t$ (i.e., the beams of the current module set $\mathcal{M}_t$), and previous beam set $\mathcal{B}_{t-1}$ (i.e., the beams of the previous module set $\mathcal{M}_{t-1}$) are defined (information 702). If the current module set $\mathcal{M}_t$ is the same as the set of the previously selected modules $\mathcal{M}_{t-1}$ (i.e., $\mathcal{M}_t == \mathcal{M}_{t-1}$, determined at step 704), then beam management can continue in the usual fashion, e.g., the best beam to use for transmission/reception can be decided based on the highest RSRP in the RSRP table (step 706).

If, however, it is determined at step 704 that the current module set $\mathcal{M}_t$ is not identical to the set of the previously selected modules $\mathcal{M}_{t-1}$, then the best beam needs to be determined for transmission/reception for use in the first beam search cycle. In this case, the process proceeds by determining whether there are common modules between the current module set $\mathcal{M}_t$ and the set of the previously selected modules $\mathcal{M}_{t-1}$ (i.e., $\mathcal{M}_t \cap \mathcal{B}_{t-1} \neq 0$, determined at step 708).

If there are common modules in the current module set $\mathcal{M}_t$ and the previous module set $\mathcal{M}_{t-1}$, then the beam with the highest RSRP in the set of beams common to both $\mathcal{M}_t$ and $\mathcal{M}_{t-1}$ (i.e., $\mathcal{B}_t \cap \mathcal{B}_{t-1}$) can be used (step 710). This beam can be used for transmission/reception during the first beam search cycle after the module set $\mathcal{M}$ is changed. If, however, it is determined at step 708 that there is no common module between the current module set $\mathcal{M}_t$ and the previous module set $\mathcal{M}_{t-1}$, then the process searches for a beam in $\mathcal{B}_t$ that has the highest similarity with the best beam in the set $\mathcal{B}_{t-1}$ (step 712).

The purpose of step 712 is to find a beam in $\mathcal{B}_t$ that has a pattern most similar to the best beam in the set $\mathcal{B}_{t-1}$, as such a beam is likely to have a high signal quality metric as compared to other beams in the set $\mathcal{B}_t$ with unknown signal quality metrics. Different measures of similarity of two beam patterns can be used. In one embodiment, assuming that there are uniform sampling points (θ,φ) on the unit-sphere, a similarity score is defined as $$s = \sum_{(\theta,\phi)} G(\theta, \phi) B(\theta, \phi) \qquad (1)$$

where G ($\theta,\phi$) is the radiation pattern of a candidate beam in the set $\mathcal{B}_t$, and B ($\theta,\phi$) is the radiation pattern of the best beam in the set $\mathcal{B}_{t-1}$.

In another embodiment, based on the RSRP measurements of the beams in $\mathcal{B}_{t-1}$, an estimate of the angle of arrival (AoA) ($\theta,\phi$) of a signal from a wireless channel is determined in terms of the UE coordinates. The beam from the set $\mathcal{B}_t$ that has the highest gain in the direction ($\theta,\phi$) is then selected as the best beam to be used for transmission/reception during the first beam search cycle.

Figure 8:
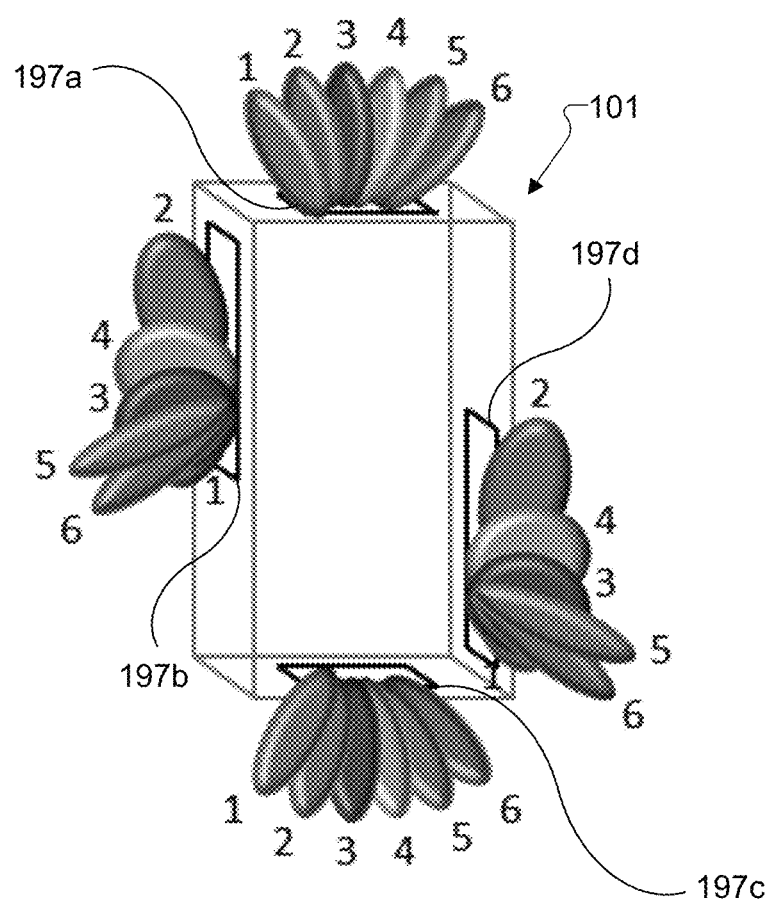
FIG. 8 illustrates an example of an electronic device performing low-latency beam management according to embodiments of the present disclosure.

FIG. 8 illustrates an example of an electronic device performing low-latency beam management according to embodiments of the present disclosure. For the purposes of this disclosure, the process of FIG. 8 represents operations of an electronic device 101, which is discussed as a UE. It is understood that the operations could apply to any suitable wireless communication devices in any suitable wireless communication system.

Once an initial best beam has been selected for the first beam search cycle after the set $\mathcal{M}$ changes to $\mathcal{M}_t$ (or simply after a set $\mathcal{M}$ is selected), beam management of the antenna modules 107 in the module set $\mathcal{M}_t$ is performed to reduce the latency of the beam search. If there are M active antenna modules 197, then the hardware may support M basebands, i.e., the M antenna modules 197 can operate independently. In other embodiments it is possible to have other architectures, e.g., an architecture in which less than M basebands are available, such that the antenna modules 197 cannot all operate independently. In an extreme case, an architecture having only one baseband may exist. In the single baseband case, if multiple antenna modules 197 are activated at the same time, it is possible to conceptualize multiple antenna modules 197 as a single antenna module which is physically distributed. Then beam management can proceed as in a single module case. Similarly, if there are less than M but more than one baseband, the antenna modules 197 connected to each baseband are conceptualized as a single distributed antenna module.

For M basebands, beam management can happen in parallel on all M antenna modules 197 independent of other antenna modules 197. The objective of beam management is to find the best beam in each antenna module 197 to use for transmission/reception. It is possible for an electronic device 101 to have antenna modules 197 of different sizes, i.e., the antenna element array size of each antenna module 197 can be different. Therefore, the size of the codebook for antenna modules 197 can also be different, resulting in different numbers of beams for different antenna modules 197.

If there are $B_i$ beams in the i-th antenna module 197, then the beam search time for all antenna modules 197 is limited by $$\max_i B_i.$$

Accordingly, if there is a significant difference in the number of beams across different antenna modules 197, the antenna modules 197 with a large number of beams become the beam management latency bottleneck. The beam search accuracy of antenna modules 197 with large codebooks can be traded off to reduce the beam search time of all the antenna modules 197. Specifically, the antenna modules 197 that have small codebooks can run an exhaustive search over all candidate beams in their codebooks, whereas the antenna modules 197 with large codebooks can run a hierarchical search in order to reduce beam search latency to be comparable to the other modules with smaller codebooks.

FIG. 8 illustrates an example of this beam searching scenario in an electronic device 101 which has 4 active antenna modules 197a, 197b, 197c, and 197d (i.e., $\mathcal{M}$ includes the antenna modules 197a, 197b, 197c, and 197d). The top and bottom modules 197a and 197c have fewer beams in their codebooks (in this case 6) than the left and right modules 197b and 197d (which in this case have 8 beams in their codebooks), so the top and bottom modules 197a and 197c run an exhaustive beam search. In order to reduce the number of beams to search for the left and right modules 197b and 197d, a hierarchical beam search is performed. The beams of each antenna module 197a, 197b, 197c, and 197d are numbered to show the sequence in which each of the beams is tested.

In the example of an antenna module having 8 narrow beams in its codebook (such as antenna modules 197b and 197d), a 3 tier hierarchical search begins with 2 wide beams. Each wide beam contains 2 beams of medium width, and each medium width beam contains 2 narrow beams. Wide beams 1 and 2 are tested first, and wide beam 1 is selected as the best beam among the two. Next, medium width beams 3 and 4 (which are contained within wide beam 1) are tested, and medium width beam 3 is selected as the best beam among these two. Finally, narrow beams 5 and 6 (which are contained within medium width beam 3) are tested, and the best beam among these two is selected as the best beam for the module 197b. In this way, only 6 beams are tested. This strategy reduces the beam management latency to the level of a module with a small codebook, e.g., a 6 beam codebook. Accordingly, the beam search latency bottleneck caused by the modules 197b and 197d is removed.

In another embodiment, the hierarchical beam search illustrated in the example of FIG. 8 can be modified to reduce the latency as well as the power consumption of the beam management process for the set $\mathcal{M}$ of active antenna modules 197. The power consumption roughly scales with the number of modules | $\mathcal{M}$ |. Higher power consumption has implications on battery life and device temperature of the electronic device 101. Therefore, it is desirable to reduce the power consumption during the beam search phase.

Figure 9:
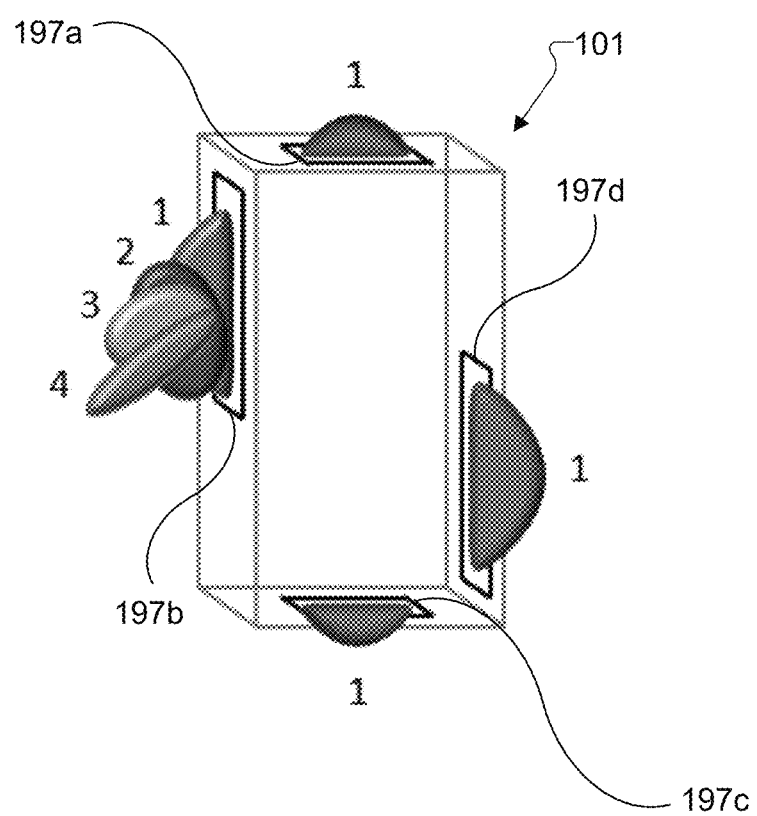
FIG. 9 illustrates one example strategy to reduce the beam search power consumption as well as the beam search latency according to embodiments of the present disclosure.

One example strategy to reduce the beam search power consumption as well as the beam search latency according to embodiments of the present disclosure is illustrated in FIG. 9. In this example, the best antenna module 197 is first selected from the set of active antenna modules $\mathcal{M}$ (which may be referred to as the module determination phase of the strategy), and beam search is then performed only on the selected best antenna module 197. To reduce power consumption in the module determination phase, the strategy takes advantage of the fact that each antenna module 197 is comprised of multiple antenna elements that are connected through chains, and some of these chains can be de-activated to reduce the power consumption of the antenna module 197. By performing a coarse search over all the antenna modules 197 using an X chain beam per module instead of a full C chain beam (wherein a full chain beam is a narrow beam), power consumption is reduced.

In the module determination phase, X can be chosen to be as small as 1. This is illustrated in FIG. 9, wherein each active antenna module 197a, 197b, 197c, and 197d has a wide beam labeled as beam 1 which represents the X=1 chain beam. As the number of antenna elements in each antenna module 197 can be different, the number of sub-chains can also be different for each antenna module 197. Based on RSRP, or any other suitable metric of signal quality, the best antenna module 197 can be determined from the X chain beam measurement. In the example of FIG. 9, the antenna module 197b is determined to be the best antenna module 197 in the set $\mathcal{M}$ of active antenna modules 197 of the electronic device 101.

Once the best antenna module 197 is determined, a beam search is performed on only the beams of the selected antenna module 197 to find the best beam of the selected antenna module 197. In the example of FIG. 9, a beam search is performed on only the beams of antenna module 197b. By not performing a beam search on the remaining active antenna modules 197a, 197c, and 197d, power consumption is significantly reduced.

To further reduce the power consumption during a hierarchical search of the beams of the best antenna module 197, the earlier stages of a hierarchical search (i.e., when the tested beams are wider) can be performed using sub-chain beams with a lower number of chains, e.g., X+1, where X is the number of chains that was used to determine the best antenna module 197 in the module determination phase. In other words, the hierarchical search can begin with testing the X+1 chain beams within the best X chain beam. Similarly, the later stages of the hierarchical search (when the tested beams become narrower) can be performed using sub-chain beams with a higher number of chains, or even full chain (i.e., C chain) beams.

In one example embodiment, the hierarchical search is performed beginning with a search on the X chain beams of the selected best antenna module 197, then on the X+1 chain beams within the best X chain beam, then on the X+2 chain beams within the best X+1 chain beam, and so on, until the final search is performed on the full C chain beams within the best C−1 chain beam. As a result, the best full C chain beam within the best active antenna module 197 is found. In another embodiment, either a hierarchical search or an exhaustive search can be performed depending on the characteristics of the antenna module 197 selected in the module determination phase. For example, a hierarchical search can be performed if the selected module has a large codebook, or an exhaustive search can be performed if the selected module has a small codebook. In some embodiments, a large codebook is considered to be any codebook having a size larger than the minimum codebook size among all active antenna modules.

In another example strategy for low-latency, low-power beam management, the electronic device 101 estimates the AoA of incoming DL beams based on the radiation pattern and RSRP of the measured beams, and then determines the next antenna modules 197 and beams to measure. If the probability that the AoA falls in the angular coverage region of an antenna module 197 is small (e.g., less than a given threshold), the device stops performing a beam search on that antenna module 197. The priority of the modules can, in some embodiments, be determined by the probability of the module being the best module. The antenna modules 197 with a high probability of being the best module could be searched with full chain narrow beams, while the antenna modules 197 with a low probability of being the best module could be searched with sub chain narrow beams to save power.

In one embodiment, the probability that of an antenna module 197 being the best module is calculated as follows. The channel gain γ is defined to include the base station power, base station beam gain, wireless channel strength, but not the UE beam gain. The AoA (θ,φ) is estimated as follows. First, the RSRP measurement (RSRP$_i$) and the radiation pattern (G$_i$(θ,φ)) of beam i is used to compute the joint distribution of channel gain and AoA, with the assumption that the RSRP noise follows a Gaussian distribution:

$$p(\theta, \phi, \gamma) \sim \prod_i \exp(-(RSRP_i - \gamma - G_i(\theta, \phi))^2) \quad (2)$$

Then the probability distribution of (θ,φ) is determined by maximization over channel gain:

$$p(\theta, \phi) = \max_\gamma p(\theta, \phi, \gamma) \quad (3)$$

In the last step, the probability of AoA over the coverage region of the m-th module, which is denoted as D$_m$, is summed to obtain the probability p$_m$ that m-th module is the best module:

$$p_m \sim \sum_{(\theta,\phi) \in D_m} p(\theta, \phi) \quad (4)$$

Figure 10A:
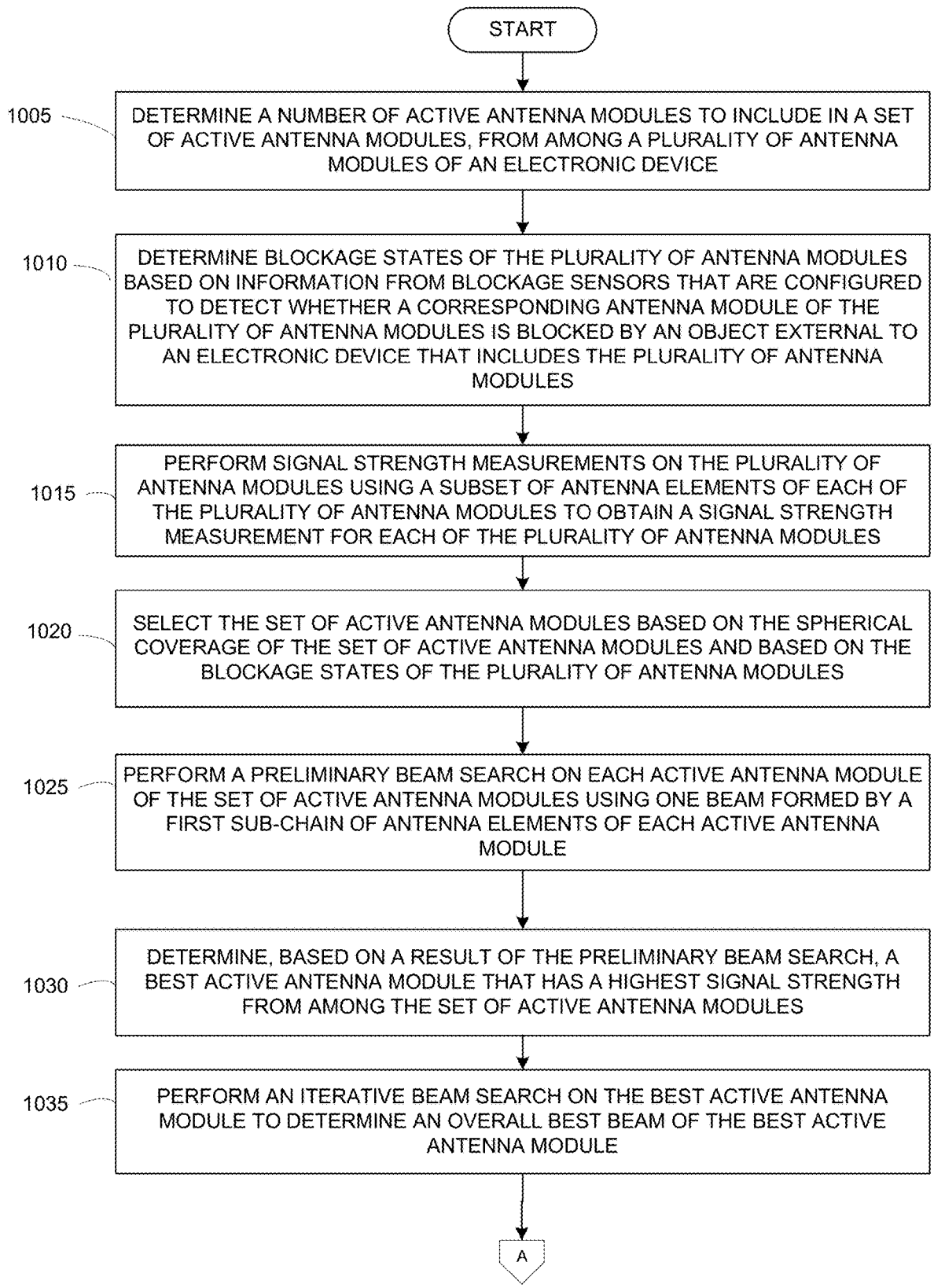
FIGS. 10A-10B illustrate an example process for low-latency, low-power beam management in accordance with various embodiments of the present disclosure.
Figure 10B:
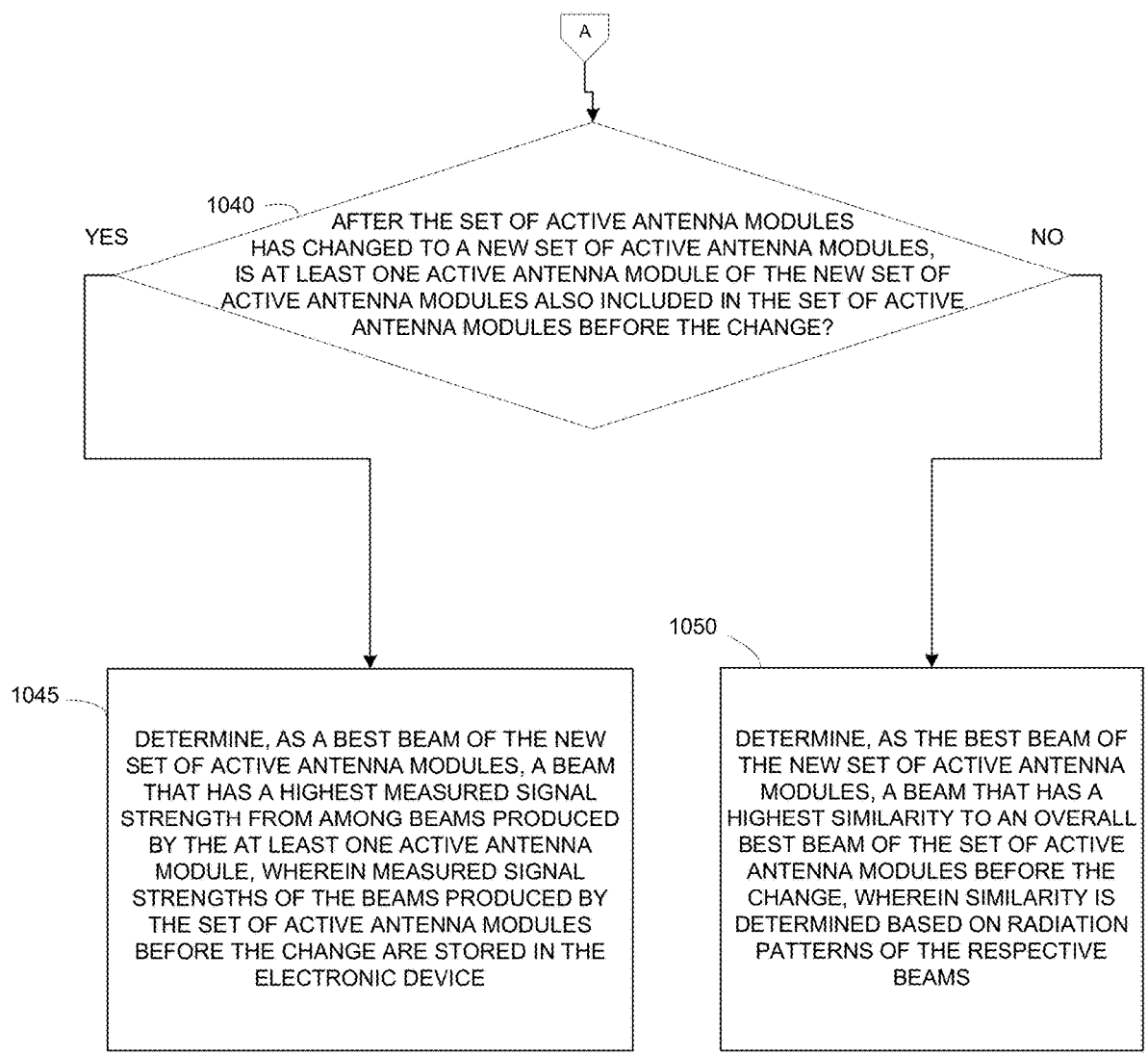

FIGS. 10A-10B illustrate an example process for low-latency, low-power beam management in accordance with various embodiments of the present disclosure. The process is performed by an electronic device such as electronic device 101.

The process begins with the device determining a number of active antenna modules to include in a set of active antenna modules, from among a plurality of antenna modules of the device (step 1005). The device can determine the number of active antenna modules based on a folding state of the device, and based on side information (or state information) of the device such as a current battery level of the device or a current temperature of the device. For example, the device can determine to reduce the number of active antenna modules when the device is in a folded state, which can be determined based on folding state sensors in the device. The device can also determine to reduce the number of active antenna modules as the current battery level of the device lowers, or as the current temperature of the device increases.

Next, the device then determines blockage states of the plurality of antenna modules based on information from blockage sensors that are configured to detect whether a corresponding antenna module is blocked by an object external to the device (step 1010). For example, a blockage sensor can detect that a user's hand is blocking an antenna module corresponding to the blockage sensor.

The device then performs signal strength measurements on the plurality of antenna modules using a subset of antenna elements of each of the plurality of antenna modules to obtain a signal strength measurement for each of the plurality of antenna modules (step 1015).

After this, the device selects the set of active antenna modules based on the spherical coverage of the set of active antenna modules and based on the blockage states of the plurality of antenna modules (step 1020). For example, the device selects the set of active antenna modules such that the spherical coverage of the set of active antenna modules is maximized and redundancy in coverage of the set of active antenna modules is minimized. In some embodiments, the device determines the spherical coverage of the potential set of active antenna modules from codebooks of the antenna modules in the potential set of active antenna modules. The device can also select only antenna modules for which the signal strength measurement is greater than a predetermined threshold. The device can also avoid selecting antenna modules that are blocked as indicated by their respective blockage states.

Once the set of active antenna modules has been selected, the device performs a preliminary beam search on each active antenna module of the set of active antenna modules using one beam formed by a first sub-chain of antenna elements of each active antenna module (step 1025).

Then, the device determines, based on a result of the preliminary beam search, a best active antenna module as the active antenna module that has a highest signal strength from among the set of active antenna modules (step 1030). The device next performs an iterative beam search on the best active antenna module to determine an overall best beam of the best active antenna module (step 1035).

Each iteration of the beam search is performed within a coverage area of a previous best beam determined by an immediately previous iteration of the beam search. Each iteration of the beam search determines an updated best beam from among beams narrower than the previous best beam, until the overall best beam of the best active antenna module is determined from among the narrowest beams the best active antenna module is able to form.

In some embodiments, each iteration of the beam search is performed using a current sub-chain of antenna elements of the at least one active antenna module, wherein the current sub-chain includes one additional antenna element as compared to a previous sub-chain used for the immediately previous iteration of the beam search. Accordingly, the current sub-chain forms narrower beams than the previous sub-chain. The beams of the current sub-chain are formed within the coverage area of the previous best beam of the previous sub-chain as determined based on the immediately previous iteration of the beam search. In some embodiments, the current sub-chain for each iteration of the beam search is chosen such that it forms multiple beams within the coverage area of the previous best beam, and those multiple beams have a combined coverage area that is similar to the coverage area of the previous best beam. In one such embodiment, the current sub-chain is chosen such that it forms two beams within the coverage area of the previous best beam.

The updated best beam for each iteration of the beam search may be determined, based on a result of the iteration, as the beam of the current sub-chain that has the highest signal strength from among the beams formed by the current sub-chain. Then, in the next iteration of the beam search the current sub-chain becomes the previous sub-chain, and the updated best beam becomes the previous best beam. Once the overall best beam of the best active antenna module is determined, step 1035 ends. The device may use the determined best beam to perform uplink and downlink communications until there is a change in the set of active modules.

Referring now to FIG. 10B, in the event that the set of active antenna modules has changed to a new set of active antenna modules, the device determines whether at least one active antenna module of the new set of active antenna modules was also included in the set of active antenna modules before the change occurred (step 1040).

If the device determines that the new set of active antenna modules does include at least one active antenna module that was also included in the previous set of active antenna modules, the process moves to step 1045. At step 1045, the device determines the best beam of the new set of active antenna modules to be the beam that has the highest measured signal strength from among beams produced by the at least one active antenna module that was also included in the previous set of active antenna modules. In some embodiments, measured signal strengths of the beams produced by the set of active antenna modules before the change are stored in the device for this comparison.

If, at step 1040, the device determines that none of the active antenna modules in the new set of active antenna modules were also included in the previous set of active antenna modules, the process moves to step 1050. At step 1050, the device determines the best beam of the new set of active antenna modules to be the beam that has the highest similarity to the overall best beam of the previous set of active antenna modules. In some embodiments, beam similarity is determined based on radiation patterns of the respective beams.

After either step 1045 or 1050 is completed, the device may use the best beam of the new set of active antenna modules to perform uplink and downlink communications until the device is able to perform a beam search to obtain signal quality metrics on the beams of the new set of active antenna modules.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An electronic device comprising:
a plurality of antenna modules; and
a processor configured to:
determine a number of active antenna modules to include in a set of active antenna modules; and
select the set of active antenna modules, from among the plurality of antenna modules, based on a spherical coverage of the set of active antenna modules and based on information on blockage states of the plurality of antenna modules.

2. The electronic device of claim 1, wherein the processor is configured to determine the number of active antenna modules based on a folding state of the electronic device, and based on side information of the electronic device.

3. The electronic device of claim 2, wherein the side information includes a current battery level of the electronic device and a current temperature of the electronic device.

4. The electronic device of claim 3, wherein the processor is configured to:
reduce the number of active antenna modules based on the folding state of the electronic device being folded,
reduce the number of active antenna modules as the current battery level of the electronic device lowers, and
reduce the number of active antenna modules as the current temperature of the electronic device increases.

5. The electronic device of claim 1, wherein the processor is configured to:
determine the spherical coverage of the set of active antenna modules from codebooks of the antenna modules in the set of active antenna modules, and
select the set of active antenna modules such that the spherical coverage of the set of active antenna modules is maximized and redundancy in coverage of the set of active antenna modules is minimized.

6. The electronic device of claim 1, further comprising:
at least one blockage sensor configured to detect whether a corresponding antenna module of the plurality of antenna modules is blocked by an object external to the electronic device,
wherein the processor is configured to:
determine the blockage states of the plurality of antenna modules based on information from the at least one blockage sensor, and
not select, for the set of active antenna modules, antenna modules that are blocked as indicated by their respective blockage states.

7. The electronic device of claim 1, wherein the processor is configured to:
perform signal strength measurements on the plurality of antenna modules using a subset of antenna elements of each of the plurality of antenna modules to obtain a signal strength measurement for each of the plurality of antenna modules; and
select, for the set of active antenna modules, antenna modules for which the signal strength measurement is greater than a predetermined threshold.

8. An electronic device comprising:
a set of active antenna modules; and
a processor configured to perform an iterative beam search on at least one active antenna module of the set of active antenna modules to determine an overall best beam of the at least one active antenna module,
wherein the processor is configured to perform each iteration of the beam search within a coverage area of a previous best beam determined by an immediately previous iteration of the beam search, and to determine an updated best beam from among beams narrower than the previous best beam, until the overall best beam of the at least one active antenna module is determined from among the narrowest beams that the at least one active antenna module is able to form.

9. The electronic device of claim 8, wherein, for each iteration of the beam search, the processor is configured to:
perform the iteration using a current sub-chain of antenna elements of the at least one active antenna module, wherein the current sub-chain forms narrower beams than a previous sub-chain used for the immediately previous iteration of the beam search, and wherein the beams of the current sub-chain are formed within the coverage area of the previous best beam of the previous sub-chain as determined based on the immediately previous iteration of the beam search; and
determine as the updated best beam, based on a result of the iteration, a beam of the current sub-chain that has a highest signal strength from among the beams formed by the current sub-chain,
wherein, for a next iteration of the beam search:
the current sub-chain becomes the previous sub-chain, and
the updated best beam becomes the previous best beam.

10. The electronic device of claim 9, wherein, for each iteration of the beam search, the current sub-chain includes one additional antenna element as compared to the previous sub-chain.

11. The electronic device of claim 9, wherein, for each iteration of the beam search, the processor is configured to choose the current sub-chain such that it forms multiple beams within the coverage area of the previous best beam, and those multiple beams have a combined coverage area that is similar to the coverage area of the previous best beam.

12. The electronic device of claim 8, wherein the processor is further configured to:
perform a preliminary beam search on each active antenna module of the set of active antenna modules using one beam formed by a first sub-chain of antenna elements of each active antenna module; and
determine, based on a result of the preliminary beam search, a best active antenna module that has a highest signal strength from among the set of active antenna modules,
wherein the processor is configured to perform the iterative beam search only on the best active antenna module.

13. The electronic device of claim 8, wherein the processor is further configured to:
determine, after the set of active antenna modules has changed to a new set of active antenna modules, that at least one active antenna module of the new set of active antenna modules was also included in the set of active antenna modules before the change; and
determine, as a best beam of the new set of active antenna modules, a beam that has a highest measured signal strength from among beams produced by the at least one active antenna module,
wherein measured signal strengths of the beams produced by the set of active antenna modules before the change are stored in the electronic device.

14. The electronic device of claim 8, wherein the processor is further configured to:
determine, after the set of active antenna modules has changed to a new set of active antenna modules, that no active antenna modules in the new set of active antenna modules were also included in the set of active antenna modules before the change; and
determine, as a best beam of the new set of active antenna modules, a beam that has a highest similarity to an overall best beam of the set of active antenna modules before the change,
wherein the processor is configured to determine similarity based on radiation patterns of the respective beams.

15. A method of beam management, comprising:
determining a number of active antenna modules to include in a set of active antenna modules; and
selecting the set of active antenna modules, from among a plurality of antenna modules of an electronic device, based on a spherical coverage of the set of active antenna modules and based on information on blockage states of the plurality of antenna modules.

16. The method of claim 15, further comprising:
determining the number of active antenna modules based on a folding state of an electronic device that includes the plurality of antenna modules, and based on side information of the electronic device,
wherein the side information includes a current battery level of the electronic device and a current temperature of the electronic device,
wherein the number of active antenna modules is reduced based on the folding state of the electronic device being folded,
wherein the number of active antenna modules is reduced as the current battery level of the electronic device lowers, and
wherein the number of active antenna modules is reduced as the current temperature of the electronic device increases.

17. The method of claim 15, further comprising:
determining the spherical coverage of the set of active antenna modules from codebooks of the antenna modules in the set of active antenna modules;
determining the blockage states of the plurality of antenna modules based on information from blockage sensors that are configured to detect whether a corresponding antenna module of the plurality of antenna modules is blocked by an object external to an electronic device that includes the plurality of antenna modules;
performing signal strength measurements on the plurality of antenna modules using a subset of antenna elements of each of the plurality of antenna modules to obtain a signal strength measurement for each of the plurality of antenna modules; and
selecting the set of active antenna modules such that the spherical coverage of the set of active antenna modules is maximized and redundancy in coverage of the set of active antenna modules is minimized, such that antenna modules for which the signal strength measurement is greater than a predetermined threshold are selected, and such that antenna modules that are blocked as indicated by their respective blockage states are not selected.

18. The method of claim 15, further comprising:
performing a preliminary beam search on each active antenna module of the set of active antenna modules using one beam formed by a first sub-chain of antenna elements of each active antenna module;
determining, based on a result of the preliminary beam search, a best active antenna module that has a highest signal strength from among the set of active antenna modules; and
performing an iterative beam search on the best active antenna module to determine an overall best beam of the best active antenna module,
wherein each iteration of the beam search is performed within a coverage area of a previous best beam determined by an immediately previous iteration of the beam search, and each iteration of the beam search determines an updated best beam from among beams narrower than the previous best beam, until the overall best beam of the best active antenna module is determined from among the narrowest beams the best active antenna module is able to form,
wherein each iteration of the beam search is performed using a current sub-chain of antenna elements of the at least one active antenna module, wherein the current sub-chain includes one additional antenna element as compared to a previous sub-chain used for the immediately previous iteration of the beam search and forms narrower beams than the previous sub-chain, and wherein the beams of the current sub-chain are formed within the coverage area of the previous best beam of the previous sub-chain as determined based on the immediately previous iteration of the beam search,
wherein for each iteration of the beam search, the current sub-chain is chosen such that it forms multiple beams within the coverage area of the previous best beam, and those multiple beams have a combined coverage area that is similar to the coverage area of the previous best beam,
wherein the updated best beam for each iteration of the beam search is determined, based on a result of the iteration, as a beam of the current sub-chain that has a highest signal strength from among the beams formed by the current sub-chain, and
wherein, for each iteration of the beam search, in a next iteration of the beam search the current sub-chain becomes the previous sub-chain, and the updated best beam becomes the previous best beam.

19. The method of claim 18, further comprising:
determining, after the set of active antenna modules has changed to a new set of active antenna modules, whether at least one active antenna module of the new set of active antenna modules was also included in the set of active antenna modules before the change;
determining, as a best beam of the new set of active antenna modules, based on a determination that at least one active antenna module of the new set of active antenna modules was also included in the set of active antenna modules before the change, a beam that has a highest measured signal strength from among beams produced by the at least one active antenna module, wherein measured signal strengths of the beams produced by the set of active antenna modules before the change are stored in the electronic device; and
determining, as the best beam of the new set of active antenna modules, based on a determination that no active antenna modules in the new set of active antenna modules were also included in the set of active antenna modules before the change, a beam that has a highest similarity to an overall best beam of the set of active antenna modules before the change, wherein similarity is determined based on radiation patterns of the respective beams.

20. A non-transitory computer-readable medium configured to store instructions that, when executed by a processor, cause the processor to:
determine a number of active antenna modules to include in a set of active antenna modules; and
select the set of active antenna modules, from among the plurality of antenna modules, based on a spherical coverage of the set of active antenna modules and based on information on blockage states of the plurality of antenna modules.

* * * * *